(12) United States Patent
Bakshi et al.

(10) Patent No.: US 12,513,138 B2
(45) Date of Patent: Dec. 30, 2025

(54) UNIFIED OBJECT APPROACH TO STORING AND DISPLAYING E-SIGNATURE PROCESSING EVENTS

(71) Applicant: Box, Inc., Redwood City, CA (US)

(72) Inventors: Rohit Bakshi, Campbell, CA (US); Virender Gupta, Morganville, NJ (US)

(73) Assignee: Box, Inc., Redwood City, CA (US)

( * ) Notice: Subject to any disclaimer, the term of this patent is extended or adjusted under 35 U.S.C. 154(b) by 189 days.

(21) Appl. No.: 18/459,220

(22) Filed: Aug. 31, 2023

(65) Prior Publication Data

US 2025/0080525 A1 Mar. 6, 2025

(51) Int. Cl.
*H04L 9/40* (2022.01)
*G06F 9/451* (2018.01)

(52) U.S. Cl.
CPC ............ *H04L 63/083* (2013.01); *G06F 9/451* (2018.02)

(58) Field of Classification Search
CPC ............................... H04L 63/083; G06F 9/451
See application file for complete search history.

(56) References Cited

U.S. PATENT DOCUMENTS

| | | | |
|---|---|---|---|
| 2005/0091524 A1* | 4/2005 | Abe | H04L 63/04 726/26 |
| 2018/0074795 A1* | 3/2018 | Benge | H04N 21/47205 |
| 2022/0376916 A1* | 11/2022 | Wooster | H04L 9/3247 |
| 2023/0133610 A1 | 5/2023 | Storer et al. | |
| 2023/0333715 A1* | 10/2023 | Spaetzel | G06F 3/0482 |

OTHER PUBLICATIONS

Box Support, Accesing Version History, dated Feb. 26, 2020.
Docusign, Compare Document Versions, DocuSign Negotiate for Salesforce User Guide, dated Nov. 11, 2022.
Docusign, How DocuSign uses transaction data and the Certificate of Completion, Trust Center, date retrieved via Internet archive 2023.
Adobe, Electronic singature audit trails, date retrieved via Internet archive 2023.

(Continued)

*Primary Examiner* — Sm A Rahman
(74) *Attorney, Agent, or Firm* — Vista IP Law Group, LLP

(57) ABSTRACT

Methods, systems, and computer program products for electronic signature systems. Multiple components are operatively interconnected to carry out operations for securing e-signatures applied to content objects. A data processing system that interacts with user devices over a network that carries e-signature events raised by the user devices is configured to implement a content management system (CMS) that maintains a single CMS e-signature object within an object storage repository. The single CMS e-signature object is representative of multiple different versions or renditions of CMS objects. Upon an e-sign event, the data processing system modifies the single CMS e-signature object. Human cognition is aided by presentation of two different and independently operable graphical user interface (GUI) renderings, wherein a first rendering presents the single CMS e-signature object and wherein a second rendering displays at least some of the multiple different versions or renditions or properties that constituent the single CMS e-signature object.

27 Claims, 11 Drawing Sheets

(56) References Cited

OTHER PUBLICATIONS

Opentext, "OpenText Regulated Documents for the Life Sciences Industry" 21 CFR Part 11 Compliance, dated Mar. 2013.
Ironclad, Launch a Workflow, date retrieved via Internet archive 2023.
DocuSign Support, Use Compare With to compare a document with earlier versions, Docusign Negotiate for Salesforce User Guide, Last updated May 21, 2024.

* cited by examiner

2C00

Effect on a Single Unified CMS Object

| Event at CMS | Event on ESS | Signals to ESS | Example Modification of the CMS Object |
|---|---|---|---|
| Create document | – | – | – |
| Create ESS envelope | Establish link | Creation | Add envelope to object |
| Modify document | Dynamically adjust workflow progression | Command/Advice | Track modification event in object |
| Modify document | Void/Reissue envelope | Type of document modification | Track as audit item in object |
| Modify envelope | Void/Reissue envelope <workflow> | Type of envelope modification | Track as audit item in object |
| Security change on document | Void/Reissue envelope <workflow> | Command/Advice | Track as audit item in object |
| Environmental condition detection | Security change pertaining to a user device | Command/Advice | Change security metadata in object |
| Environmental condition detection | Security change pertaining to a user | Command/Advice | Change security metadata in object |

FIG. 2C

UNIFIED OBJECT APPROACH TO STORING AND DISPLAYING E-SIGNATURE PROCESSING EVENTS

TECHNICAL FIELD

This disclosure relates to electronic signature systems, and more particularly to techniques for implementing a unified object approach to storing and displaying events that are raised during e-signature processing.

BACKGROUND

Electronic signature systems ("e-sign systems" or "electronic signature systems", or "ESS") have become ubiquitous—nearly fully replacing the now archaic practice of printing, signing in hand-and-ink, and scanning or mailing the signed document to recipients. The practice of 'routing' a paper document from person to person or from desk to desk, or from office to office or from site to site, has now been almost completely obsoleted. This is because there are now sufficient technological mechanisms in place that implement at least rudimentary signatory authentication, envelope routing, and distribution of an e-signed document.

Some of these electronic signature systems have become sufficiently feature-enabled and flexible that e-signature systems are now being used to authenticate and track ongoing revisions to a document (e.g., a negotiation history of a contract) that is intended to be finalized and then signed by multiple parties. Such features, together with various technological advances that underly e-signing systems, have resulted in the ability to track every event (e.g., every signature, every modification, every workflow gate, every authentication, every comment, every transmission, every representation, etc.).

While tracking every signature, every modification, every workflow gate, every authentication, every comment, every transmission, every representation, etc. leads to better collaboration over, and governance of, these to-be-signed documents, it also leads to an explosion of information being presented (e.g., in a user interface display) to the participants in the e-signing process. Unfortunately, in many cases, the information being displayed to the participants tends to coagulate in an unstructured jumble which often occludes human cognition.

The problem to be solved is therefore rooted in various technological limitations of legacy approaches. Improved technologies are needed. In particular, improved applications of technologies are needed to address the aforementioned technological limitations of legacy approaches.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and computer program products for implementing a unified object approach to storing and displaying events and corresponding content objects that are raised during e-signature processing, which techniques advance the relevant technologies to address technological issues with legacy approaches. More specifically, the present disclosure describes techniques used in systems, methods, and in computer program products for implementing a unified object approach to storing and displaying events and corresponding content objects that are raised during e-signature processing.

The disclosed embodiments modify and improve beyond legacy approaches. In particular, the herein-disclosed techniques provide technical solutions that address the technical problems attendant to the highly unwanted and unbounded explosion of objects in legacy e-signature systems. Such technical solutions involve specific implementations (e.g., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication. For example, when performing computer operations that address the various technical problems underlying the unbounded explosion of objects in legacy e-signature systems, both memory usage and CPU cycles demanded are significantly reduced as compared to the memory usage and CPU cycles that would be needed but for practice of the herein-disclosed techniques.

The ordered combination of steps of the embodiments serve in the context of practical applications that perform steps for implementing a unified object approach to storing and displaying events and corresponding content objects that are raised during e-signature processing. As such, techniques for implementing a unified object approach to storing and displaying events and corresponding content objects that are raised during e-signature processing overcome heretofore unsolved technological problems associated with unbounded proliferation of objects in legacy e-signature systems.

Many of the herein-disclosed embodiments for implementing a unified object approach to storing and displaying events and corresponding content objects that are raised during e-signature processing are technological solutions pertaining to technological problems that arise in the hardware and software arts that underlie content management systems. Aspects of the present disclosure achieve performance and other improvements in peripheral technical fields including, but not limited to, e-signature system event management and content object storage.

Some embodiments include a sequence of instructions that are stored on a non-transitory computer readable medium. Such a sequence of instructions, when stored in memory and executed by one or more processors, causes the one or more processors to perform a set of acts for implementing a unified object approach to storing and displaying events and corresponding content objects that are raised during e-signature processing.

Some embodiments include the aforementioned sequence of instructions that are stored in a memory, which memory is interfaced to one or more processors such that the one or more processors can execute the sequence of instructions to cause the one or more processors to implement acts for implementing a unified object approach to storing and displaying events and corresponding content objects that are raised during e-signature processing.

In various embodiments, any combinations of any of the above can be organized to perform any variation of acts for a unified object approach to storing and displaying events and corresponding content objects that are raised during e-signature processing, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 2C depicts an example event signaling regime as used in systems that integrate a content management system with an e-signature system, according to an embodiment.

DETAILED DESCRIPTION

Figure 1A:
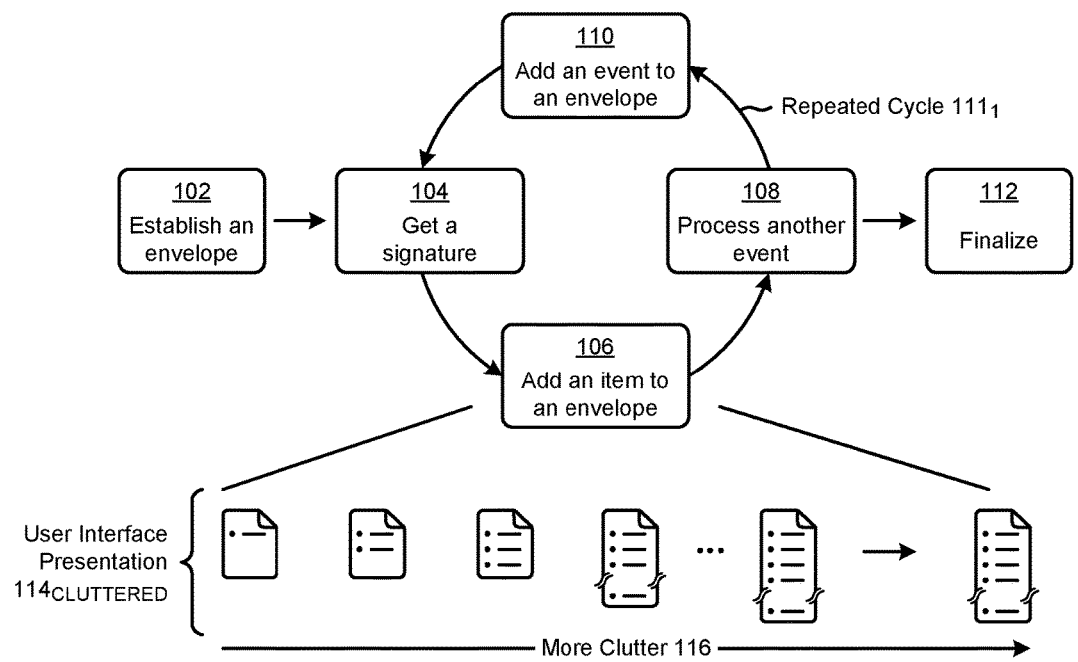
FIG. 1A exemplifies problems with e-signature systems that implement a multiple object management regime.

Aspects of the present disclosure solve problems associated with using computer systems in legacy e-signature systems. These problems are unique to, and actually have been created by, various naïve computer-implemented methods for handling content objects in legacy e-signature systems. Some embodiments are directed to a unified object approach for storing and displaying events and corresponding content objects that are raised during e-signature processing. The accompanying figures and discussions herein present example environments, systems, methods, and computer program products that facilitate deployment and ongoing operation of the systems described herein.

Overview

Disclosed herein are techniques for associating all documents and events that may occur during the course of securing electronic signatures with a single content management system (CMS) object. This single content management system object is maintained persistently throughout the e-signature process for a particular document to be e-signed, and no matter how many variations there are of the particular document to be e-signed, and no matter how many events (e.g., e-signing attempts, successful or otherwise), and no matter how many user accesses and no matter how many security alerts or other metadata changes that may happen during the e-signature process, the single content management system object for the document is maintained in a regularly-updated state. At any point in time throughout the progression through the e-signing process, a representation of this single content management system object is presented in a graphical user interface (GUI). A specialized GUI is designed, and specialized GUI tools are defined such that human cognition of the progression through the e-signing process is facilitated.

The techniques disclosed herein address a unified object approach (e.g., pertaining to the aforementioned single content management system object) involving capture techniques, ongoing content object and metadata maintenance techniques, and display techniques pertaining to occurrence of e-signature processing events. Many of the foregoing techniques pertain to (1) processing of changes that affect security classifications on a CMS document, (2) processing of changes made to security classifications of a user device (e.g., the device being used by a signatory), (3) processing of changes made to security classifications of a network link user device (e.g., the device being used by a signatory), (4) consideration of a legal hold being placed on a subject document, (5) consideration of events that constitute an audit trail, (6) processing of changes to one or more workflows that dictate changes in the course of securing electronic signatures, (7) processing of events raised by a third-party participant, (8) processing to identify and thwart malicious and/or anomalous behaviors, and/or other types of actual or potential security threats.

More specifically, as shown and discussed as pertains to the appended figures, a user interface is provided wherein, rather than overloading the GUI with a plethora of entries corresponding to a multitude of versions of, or events over, a subject to-be-e-signed document, a single content management system object is presented in the GUI. Nevertheless, even though the single content management system object is presented in a GUI, all of the foregoing versions, labels, metadata changes etc. are retained as properties, attachments, metadata, renditions, etc. that are associated with the subject to-be-e-signed (or having been e-signed) document.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in other embodiments, even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies problems with e-signature systems that implement a multiple content object management regime. The figure is being presented to illustrate a selection of problems and/or deficiencies that arise in systems that comport with a multiple content object management regime. Specifically, strictly as one example deficiency, one can see that during the course of traversing through repeated cycle $111_1$, for example, by traversing through any/all of (1) steps 104 to get a signature, (2) step 106 to add an item to an envelope, (3) step 108 to process another event, (4) step 110 to add the event to an envelope, and so on, the user interface presentation $114_{CLUTTERED}$ becomes more and more cluttered as time progresses. This is shown by the right-facing arrow labeled as more clutter 116. This cluttering of the user interface gets still even more cluttered if, for any reason, a change is made to an envelope after steps are taken (e.g., step 102) to establish that creation of an envelope has taken place. Even more clutter is presented in the user interface when the repeated cycle exits into step 112 to finalize the e-signing process.

Further details pertaining to e-signature systems and e-signing processes are described in U.S. patent application Ser. No. 17/376,110 titled "ACQUIRING ELECTRONIC-BASED SIGNATURES" filed on Jul. 14, 2021, issued as U.S. Pat. No. 12,212,593 on Jan. 28, 2025, assigned to Box, Inc., Redwood City, CA, which is hereby incorporated by reference.

The foregoing clutter problem is one that has far-reaching effects. Specifically, not only does the user interface become cluttered and unwieldy, it does so in a manner that defies human cognition. What is needed is a way to capture the various types of information in a manner that suits the type of information and how users work with the specific different types of information. One possible way to mitigate the foregoing problems and advance the technology is shown and described as pertains to FIG. 1B.

Figure 1B:
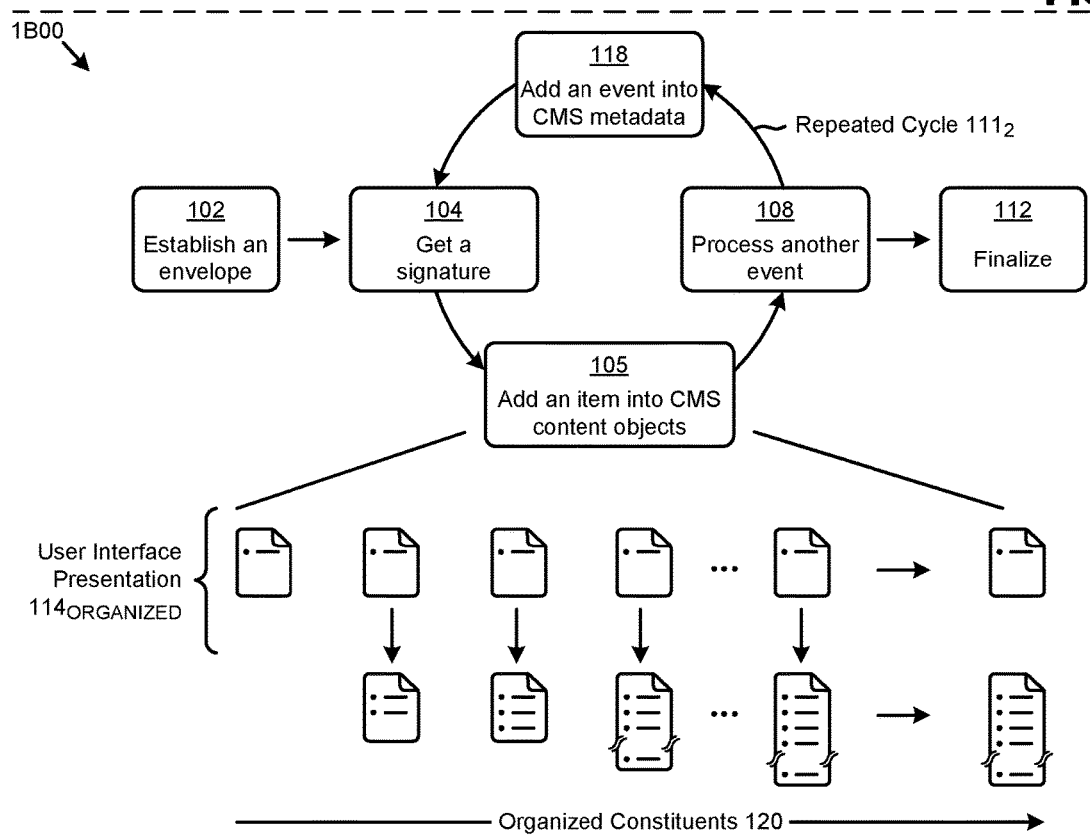
FIG. 1B illustrates an example e-signature system that uses a unified content object approach for storing and displaying e-signature processing events, according to an embodiment.

FIG. 1B illustrates an example e-signature system (ESS) that uses a unified content object approach for storing and displaying e-signature processing events. As an option, one or more variations of unified object approach 1B00 or any aspect thereof may be implemented in the context of the architecture and functionality of the embodiments described herein and/or in any environment.

The figure is being presented to illustrate how a unified object approach might be applied in an e-signature setting. Some of the steps shown in FIG. 1B are functionally similar to the corresponding steps shown in FIG. 1A. For example, step 102 to establish an envelope might be the same or similar as between the system of FIG. 1A and the system of FIG. 1B. Although some of the steps shown in FIG. 1B are functionally similar to the corresponding steps shown in FIG. 1A, some of the steps are functionally different. It is these differences, whether applied singularly or in combination, that enable the herein-disclosed technological advance.

Strictly as a selected example of functional differences between the system of FIG. 1A and the system of FIG. 1B, consider step 105 that (as shown) serves to add an item (e.g., file, attachment, etc.) to CMS content object storage. Storage and display (e.g., in a user interface) of the foregoing item (e.g., file, attachment, etc.) is done in a manner where the item is associated with a unified object, however it is displayed and stored separately from the storage and display of the unified object.

Strictly as another selected example of functional differences between the system of FIG. 1A and the system of FIG. 1B, consider step 118 that serves to add an indication of an occurrence of an event in CMS metadata. The metadata is stored separately from the unified object and in a manner that facilitates human cognition of a series or sequence of events. In this configuration, the unified object merely points to a directory or collection of metadata such that a collection of metadata can be presented to the user in a time-and-event table that is manipulable by the user at will. Other instances of different types of items and/or metadata have respective different types of storage and presentation techniques. As can be seen, the user interface presentation $114_{ORGANIZE}$ presents a single unified CMS object that refers to (e.g., points to, redirects to, etc.) its organized constituents 120. The number of organized constituents grows as repeated cycle $111_2$ is repeatedly traversed.

The foregoing discussion of FIG. 1B pertains to merely one possible embodiment and/or way to implement an e-sign system that uses a unified object approach and many variations are possible. For example, one way to implement an e-sign system using a unified object approach involves implementation within a standalone e-signature system, whereas another implementation involves an e-signature system that is integrated with a CMS. These sample configurations of (1) a standalone e-signature system and (2) an e-signature system that is integrated with a CMS are shown and described as pertains to FIG. 2A and FIG. 2B.

Figures 2A, 2B:
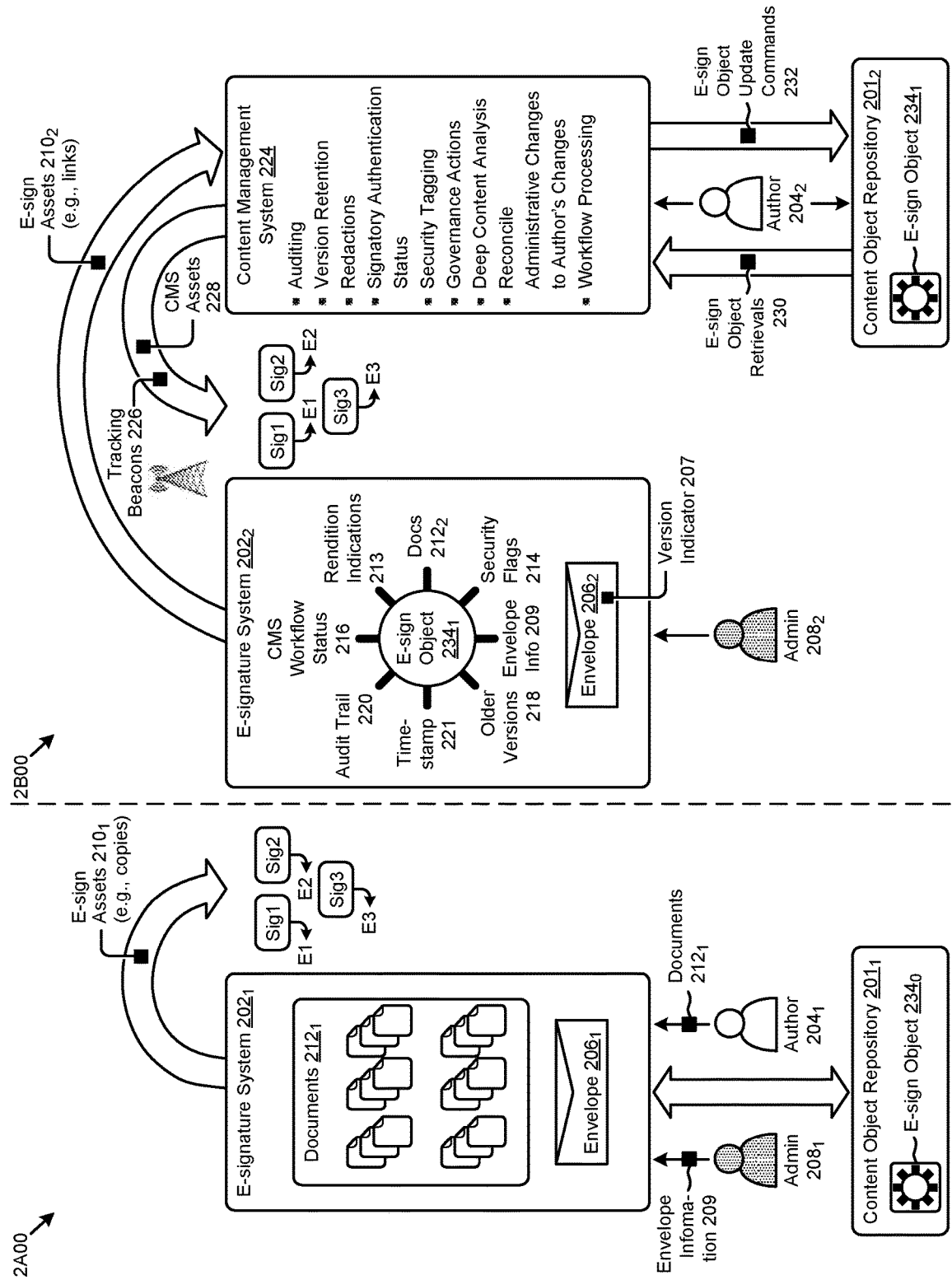
FIG. 2A illustrates a standalone e-signature system according to an embodiment.
FIG. 2B illustrates an example e-signature system integration with a content management system, according to an embodiment.

FIG. 2A illustrates a standalone e-signature system. As an option, one or more variations of standalone e-signature system 2A00 or any aspect thereof may be implemented in the context of the architecture and functionality of the embodiments described herein and/or in any environment.

The figure is being presented to illustrate how a standalone e-signature system might be configured to avail of a unified object regime. Specifically, and as shown, a standalone implementation of an e-signature system $202_1$ might store any number of documents $212_1$ either separate from (as shown) or together with an envelope $206_1$. Moreover, various portions of envelope information 209 can be stored within a particular document of the shown documents $212_1$, or various portions of envelope information 209 can be stored in an e-sign object $234_0$, which in turn is stored in a content object repository $201_1$ that stores information using any known technique.

An admin $208_1$ or an author $204_1$ can create and modify an envelope, and/or an admin $208_1$ or an author $204_1$ can create and modify documents that are made accessible to the e-signature system. In some cases those documents that are made accessible to the e-signature system are laid open to or provided to signatories (e.g., as e-sign assets $210_1$). As examples, documents that are made accessible to e-signatories might be made accessible by providing a link (e.g., URL), or alternatively, certain documents (e.g., READ-ONLY or otherwise involatile documents) might be made accessible by providing an actual copy of the particular document or documents.

As shown, content object repository $201_1$ holds an e-sign object $234_0$, which e-sign object can be configured to represent any number of files or status of any number of signatures (e.g., signature Sig1, signature Sig2, signature Sig3). As pertaining to FIG. 2A, Sig1 might raise event E1, Sig2 might raise event E2, Sig3 might raise event E3, etc.). In the specific embodiment as shown in FIG. 2A, e-signature system $202_1$ manages content object repository $201_1$, however, in some embodiments, the content object repository is managed by a CMS. This latter configuration is shown and described as pertains to FIG. 2B.

FIG. 2B illustrates an example e-signature system integration with a content management system. As an option, one or more variations of integration 2B00 or any aspect thereof may be implemented in the context of the architecture and functionality of the embodiments described herein and/or in any environment.

The figure is being presented to disclose further details pertaining to the system discussed above as pertains to FIG. 2A. More specifically, the figure is being presented to provide details as to how an e-signature system might be configured to manage many e-sign process constituents within, or associated with, a single object. Consider that modern content management systems support a wide range of functionalities that go far beyond a mere storage of documents. Strictly as examples, a content management system as used herein refers to any collection of computer infrastructure and code that handles storage under a regime that coordinates activities between CMS users and CMS agents. Such activities include, but are not limited to (1) coordinated manipulation of data that makes up content objects, (2) generation of and ongoing use of metadata that pertains to the content objects, (3) display of content objects and/or their status, and (4) display of status and/or progression through a workflow.

Many different types of CMS data are generated and/or CMS events are generated during the natural course of operation of the CMS (e.g., during auditing, during or pertaining to versioning and retention, during a progression through a CMS workflow, etc.). As such an e-sign object $234_1$ might refer to any of various types of content objects including an envelope $206_2$, one or more older versions 218 (e.g., older versions of an envelope or older versions of any other constituent of the e-sign object), a timestamp 221 an audit trail 220, a CMS workflow status 216, rendition indications 213 (e.g., renditions of an envelope or renditions of any other constituent of the e-sign object), as well as any one or more documents (e.g., docs $212_2$), security flags 214, and/or envelope information (e.g., envelope information 209, a version indicator 207, a rendition indicator, etc.), and/or any other sort of data or content objects that constitute the item or items to be e-signed. As can be seen from FIG. 2B, the single CMS e-signature object might be separate from an envelope. Additionally or alternatively, the single CMS e-signature object (e.g., e-sign object $234_1$) might contain all current information about an envelope.

Any number or types of the foregoing different types of content objects can be maintained in content object repository $201_2$. Additionally or alternatively, one or more of the different types of content objects can be maintained in any storage facility in any location, and using any known method for storage and access.

Renditions

In many cases, the foregoing data or content objects that constitute the item or items to be e-signed can be renditions of content objects. Renditions can be maintained in content object repository $201_2$. Moreover, new and/or updated renditions can be generated at any moment in time, including when another content object is added or when another content object is modified.

Further details pertaining to renditions are described in U.S. patent application Ser. No. 15/684,680 titled "GENERATION OF COLLATERAL OBJECT REPRESENTATIONS IN COLLABORATION ENVIRONMENTS" filed on Aug. 23, 2017, issued as U.S. Pat. No. 10,839,136 on Nov. 17, 2020, assigned to Box, Inc., Redwood City, CA, which is hereby incorporated by reference. As used herein, a rendition, specifically a rendition of a content object refers to an alternative representation of a particular content object and/or its metadata. For example, a Microsoft Word™ document might be deemed to be the original form of some information (e.g., a source file comprising the text of a book), whereas a rendition of that document might be in a portable document format (PDF) of that Microsoft Word document.

System Partitioning and Component Encapsulation and/or Integration with a CMS

In various partitionings, all or portions of an e-signature system $202_2$ are encapsulated within, or are integrated with, a CMS (e.g., content management system 224). As such, any information arising from e-signature system $202_2$ can be delivered to the CMS (e.g., as e-sign assets $210_2$).

Moreover, CMS assets can be enabled for access by a signatory and/or any number of CMS assets 228 can be delivered to an intended recipient. For example, rather than merely providing access to an asset, a copy of an asset may be delivered to an intended signatory. In this and other such scenarios, an asset might include or be associated with a tracking beacon 226. A tracking beacon can be used to track cradle-to-grave dissemination of a particular subject asset. In situations where information emanating from the tracking beacon indicates that the asset is being unwantedly disseminated (e.g., by a signatory or by a malaprop), or in situations where information emanating from the tracking beacon indicates that the integrity of the asset is at risk, the asset can self-destruct or it can be destroyed remotely by the CMS-either explicitly by a CMS administrator or automatically destroyed remotely based on a change in a security classification and/or a security flag. During execution of operations of the e-signature system and/or during various execution of operations of the CMS, the CMS can interact with the content object repository. In particular, the CMS can interact with the content object repository by performing e-sign object retrievals 230 and or by performing e-sign object update commands 232. Furthermore, an administrator (e.g., admin $208_2$) and/or an author $204_2$ can interact, either directly or indirectly, with the content object repository. More particularly, the e-signature system and/or the CMS can access any of the constituents of the e-sign object.

During the course of carrying out one or more protocols to secure e-signatures, the system might determine that there is suspicious activity over the envelope or any constituent components. As such, the system might associate security-related metadata with the e-sign object. For example, the system might associate a security flag with a particular e-sign object. Creation of such a security flag might raise a corresponding event and/or might be displayed in an associated GUI screen device and/or there might be some other sort of indication that there is at least a suspicion that a malaprop might be attempting to perpetrate unauthorized activities.

The foregoing written description pertains to merely one possible embodiment and/or way to implement an e-signature system. Many alternative embodiments are possible. For example, the e-signature system as comprehended in the foregoing can be implemented in conjunction with an event signaling regime, one example of which is shown and described as pertains to the following figure.

FIG. 2C depicts an example event signaling regime as used in systems that integrate a content management system with an e-signature system. As an option, one or more variations of the example event signaling regime 2C00 or any aspect thereof may be implemented in the context of the architecture and functionality of the embodiments described herein and/or in any environment.

The figure is being presented to illustrate how events at a CMS correlate to events of an ESS. The examples in the figure are merely for illustration and many other types of events and signaling are possible. The shown CMS events progress from creation of CMS objects (e.g., a document and/or an ESS envelope) through one or more modification cycles over the foregoing CMS objects, including modification of metadata and/or properties associated with the CMS objects.

In some situations, events of the CMS arise from changes in the environment (e.g., changes in the network environment, changes in user devices, etc.). Moreover, in some situations, changes in the environment cause changes to security parameters (e.g., security metadata). For example, a change in the network environment (e.g., occurrence of a network hop to a suspicious IP address) would in turn cause signaling to the ESS, which in turn would cause the ESS to modify security parameters on one or more CMS objects. As such, it can happen that during the course of collecting e-signatures over a CMS object, a change in the network environment can be determined to relate to a fraudulent activity. In some cases, such fraudulent activity can be classified in a manner that automatically reroutes traffic or otherwise ameliorates the threat. In some cases, mere identification of such fraudulent activity can cause a real-time fraud alert to be raised.

Analysis pertaining to detection of perpetrated or suspected perpetration of fraud can be implemented using machine learning. Specifically, real-time fraud detection and corresponding alerts can be implemented using a predictive model where a set of input signals (e.g., network endpoints or conditions, user device information, prior activities, etc.) are applied to the predictive model in a manner that results in output of a prediction from the model. For example, analysis of the protocol to secure e-signatures can include heightened observations of a known suspicious IP address. Such observations and analysis thereafter might result in one or more model outputs that raise an alert and/or one or more model outputs that result in automatic remediation (e.g., based on environmental conditions). Certain types or implementations of machine learning that is used to predict fraud or suspicious activities can be invoked at any moment in time. For example, such machine learning can be invoked before an envelope is created, and/or when a signatory has signed, and/or before or after the time when the signatory has signed.

Figure 2D:
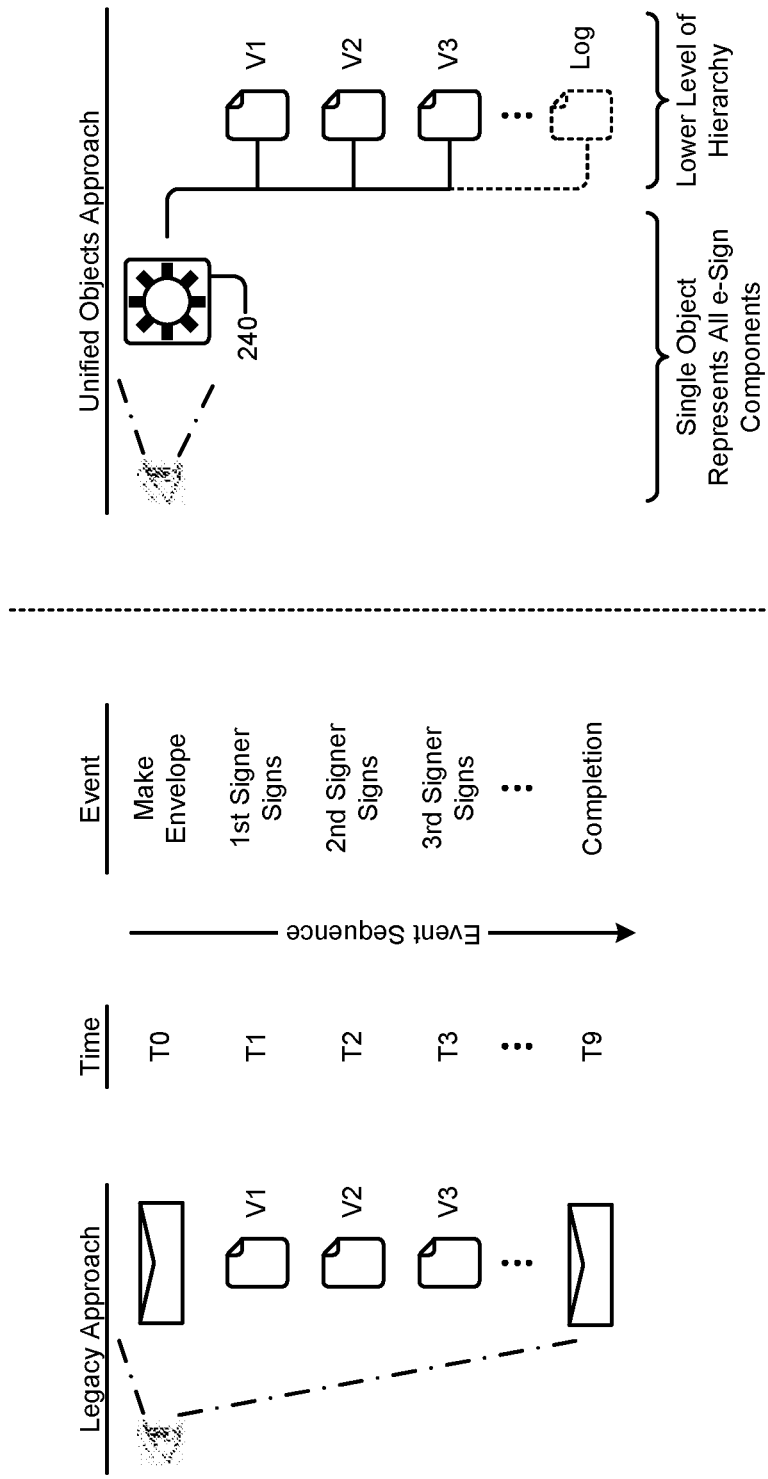
FIG. 2D is an event sequence chart that shows selected benefits of implementing a unified content object approach to storing and displaying events and corresponding content objects that are raised during e-signature processing, according to an embodiment.

FIG. 2D is an event sequence chart that shows selected benefits of implementing a unified content object approach to storing and displaying events and corresponding content objects that are raised during e-signature processing. As an option, one or more variations of event sequence or any aspect thereof may be implemented in the context of the architecture and functionality of the embodiments described herein and/or in any environment.

The figure is being presented to illustrate how a user's visibility—and hence cognition—is improved when a unified content object approach is taken. The figure spans an operational time frame (e.g., from time T0 to time T1, to time T2, to time T3, . . . , to completion at time T9). A series of corresponding operations are carried out during the operational time frame (e.g., an operation to make an envelope, the operation of e-signing by the first signer, the operation of e-signing by the second signer, the operation of e-signing by the third signer, and completion).

The left side of the figure depicts visibility to the unwanted and unmanageable explosion of e-sign events, whereas the right side of the figure depicts visibility into a graphically iconified single unified CMS object 240 that represents many sorts of e-sign events and/or content objects. As shown, the single unified CMS object is at a higher hierarchical level than are the components (e.g., files, events, etc.) that constitute the single unified CMS object. That is, the constituents (e.g., V1, V2, V3, log) of the single unified CMS object are stored and represented at a lower level of hierarchy than is the single unified CMS object.

In actual practice, there are scores of events (or more) to be considered, which means that, in absence of implementation of the herein-disclosed techniques, presentation (e.g., in a GUI) of these scores of events actually confounds human cognition.

As used herein, maintaining a unified content object that is at a higher hierarchical level than are the components of the unified content object is analogous to a file system having nested folders. That is, the aforementioned unified content object merely links to (or bounds) its constituents, which constituents are stored as files and/or CMS objects that are separate and distinct from the unified content object.

Figure 3A:
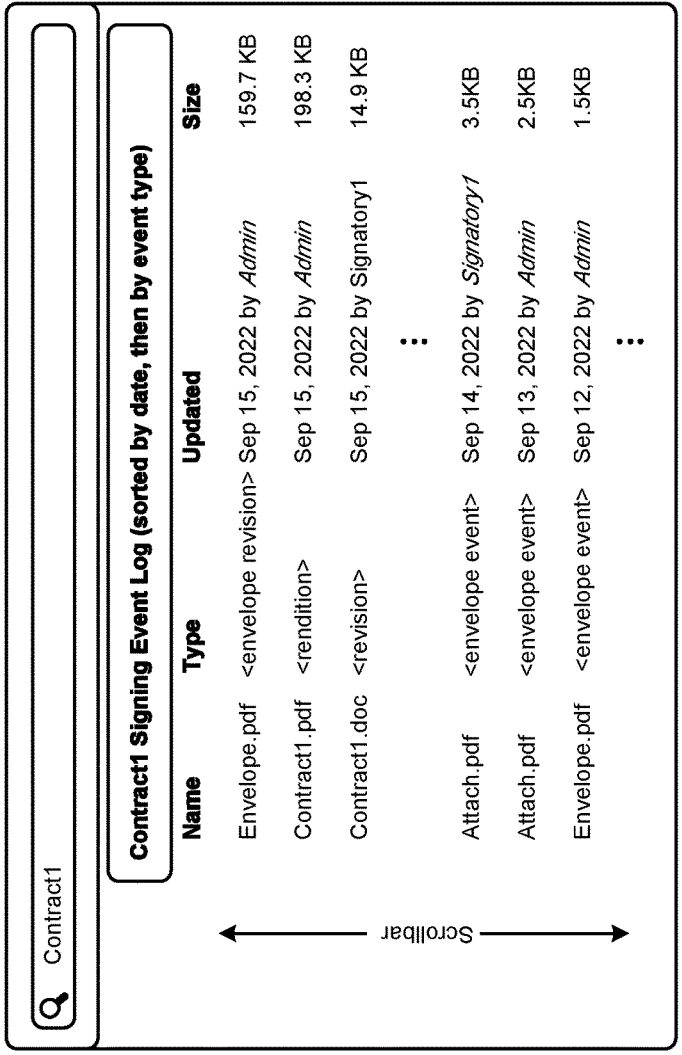
FIG. 3A depicts an overpopulated graphical user interface scrollbar region, according to an embodiment.
Figure 3B:
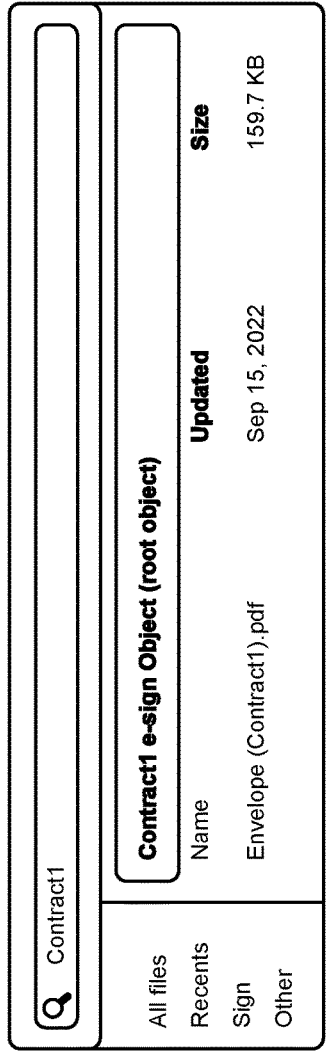
FIG. 3B depicts a unified e-signature content object screen device in a graphical user interface as used in systems that implement a unified content object approach to storing and displaying events and corresponding content objects that are raised during e-signature processing, according to an embodiment.

The foregoing written description pertains to merely one possible embodiment and/or way to implement an e-sign system that shows selected benefits of implementing the herein-disclosed techniques. Many additional benefits emerge as user interface functionality is added. For example, a user interface panel that breaks down the myriad constituents can be presented alongside a representation of a single unified CMS object. FIG. 3A and FIG. 3B are presented on the same sheet so as to offer an example of the technological advance that is brought to bear with a unified content object approach.

FIG. 3A depicts an overpopulated graphical user interface scrollbar region. The figure is being presented to illustrate human cognition problems that arise when there is an explosion in the number of e-signature events and/or when there is an explosion of e-sign components. This graphical user interface is to be compared with the unified e-signature content object approach of FIG. 3B.

FIG. 3B depicts a unified e-signature content object screen device in a graphical user interface as used in systems that implement a unified content object approach to storing and displaying events and corresponding content objects that are raised during e-signature processing. As an option, one or more variations of a graphical user interface as used in FIG. 3B or any aspect thereof may be implemented in the context of the architecture and functionality of the embodiments described herein and/or in any environment.

As shown, a command panel is shown to the left of a graphical representation of a unified e-signature content object screen device in a graphical user interface. The command panel is populated with commands which, when activated (e.g., by a pointer touch to the command), facilitate human understanding of what is happening during preparation and finalization of an envelope item. Further, some of the commands facilitate human understanding as to what is happening during the process of getting e-signatures from signatories. Strictly as one possibility, the command "Recents" assembles a specialized view (not shown here) that amalgamates the different types of events and/or documents and/or metadata changes and/or any other changes that had happened in a recent time period. Even the casual observer can see that this technique is far superior to the legacy technique of merely stuffing events and documents into a running list within a scrollable region.

In addition to the advance afforded by the forgoing command panel 310, various purpose-specific viewers can be associated with any type of constituent of a unified e-signature content object. Some examples of such viewers are shown and described as pertains to FIG. 3C.

Figure 3C:
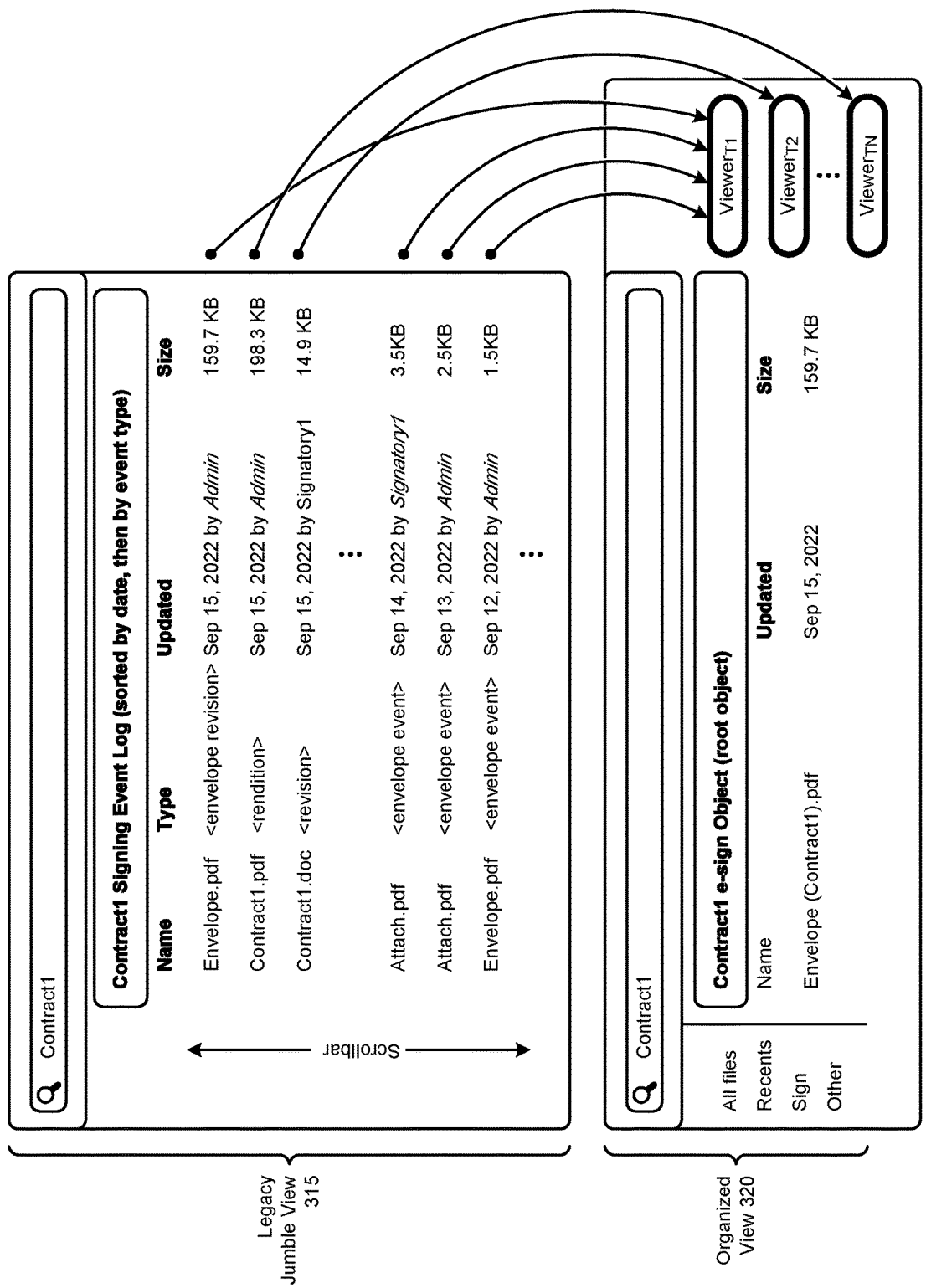
FIG. 3C depicts a unified e-signature content object screen device in a graphical user interface as used in systems that implement a unified content object approach to storing and displaying events and corresponding content objects that are raised during e-signature processing, according to an embodiment.

FIG. 3C depicts a unified e-signature content object screen device in a graphical user interface as used in systems that implement a unified content object approach to storing and displaying events and corresponding content objects that are raised during e-signature processing, according to an embodiment.

The figure depicts a legacy jumble view 315 that is presented on the same sheet as an organized view 320 of the same e-sign document.

The bottom portion of FIG. 3C shows a graphical user interface that includes organized view 320. This organized view is a view that includes a representation of a single unified CMS object (e.g., the "Contract1 e-sign Object") in association with a plurality of specialized screen devices (e.g., screen device viewer$_{T1}$, screen device viewer$_{T2}$, ..., screen device viewer$_{TN}$). Each screen device for viewing, or more precisely, the code that underlies a particular viewer is configured in accordance with the specific information of interest as pertains to a particular unified content object constituent type. In the example shown, screen device viewer$_{T1}$ corresponds to displaying information pertaining to a unified content object (e.g., an envelope), screen device viewer$_{T2}$ corresponds to a source document (e.g., a Microsoft Word document), and screen device viewer$_{T3}$ corresponds to a rendition of a source document (e.g., a PDF of a source document).

As can be seen in this embodiment, even after associating the updated instances of the multiple different versions or renditions with the single CMS e-signature object (e.g., the single unified CMS object shown as the "Contract1 e-sign Object"), it can be seen that the acts of associating the updated instances of the multiple different versions or renditions with the single CMS e-signature content object does not alter the graphical interface rendering of the single CMS e-signature content object. Rather, the multiple different versions or renditions of the single CMS e-signature content object are instead displayable in a separate rendering, specifically a second graphical representation of at least some of the multiple different versions or renditions or properties of the constituent CMS objects, which in this case correspond to one or more of the shown specialized viewer viewer$_{T1}$, specialized viewer viewer$_{T2}$, ..., and/or specialized viewer viewer$_{TN}$).

Figure 4:
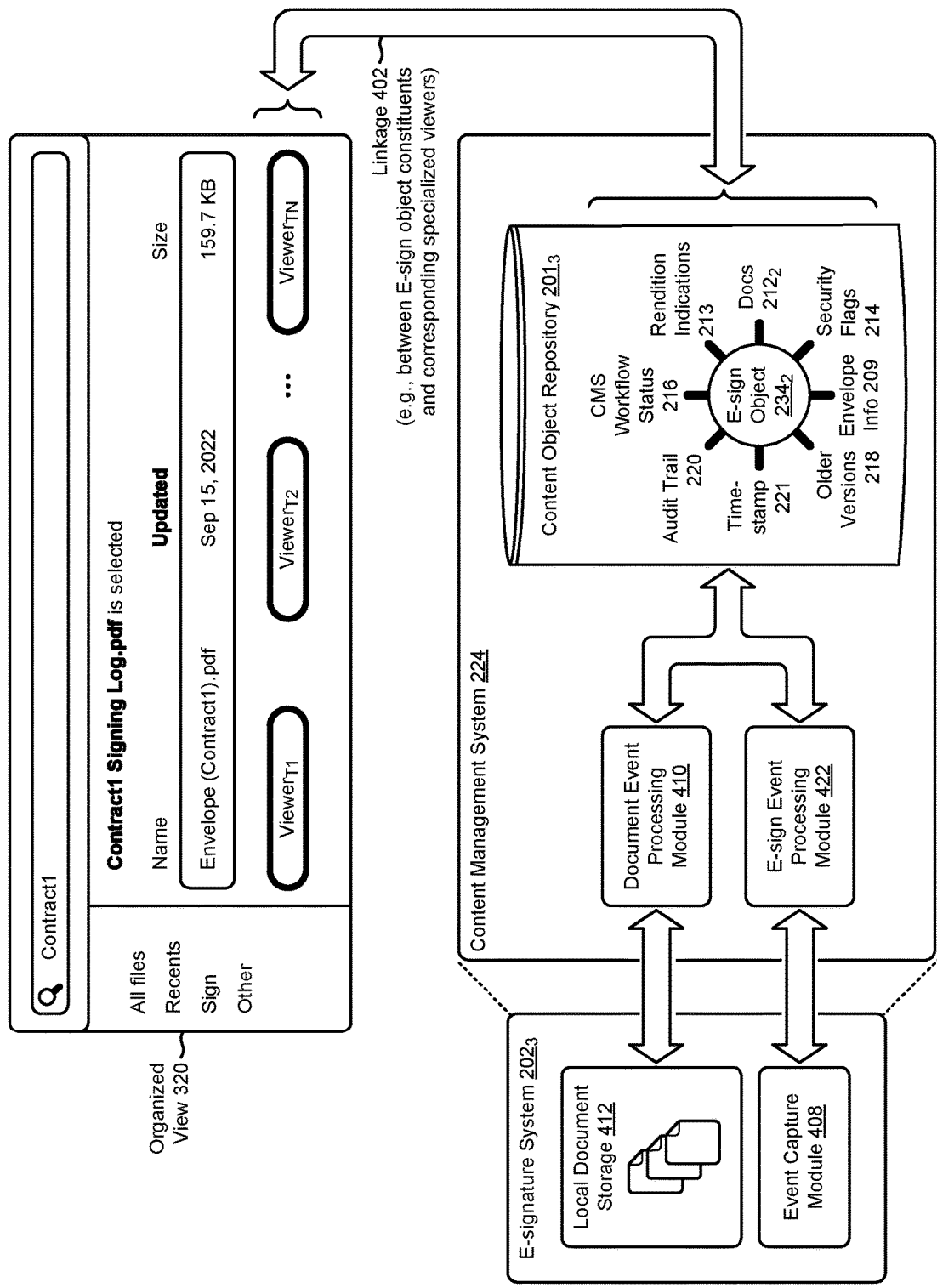
FIG. 4 illustrates an example e-signature system integration with a content management system and a graphical user interface as used in systems that implement a unified content object approach to storing and displaying events and corresponding content objects that are raised during e-signature processing, according to an embodiment.

FIG. 4 illustrates an example e-signature system integration with a content management system and a graphical user interface as used in systems that implement a unified content object approach to storing and displaying events and corresponding content objects that are raised during e-signature processing. As an option, one or more variations of the foregoing e-signature system and/or variations of the graphical user interface or any aspect thereof may be implemented in the context of the architecture and functionality of the embodiments described herein and/or in any environment.

The figure is being presented to illustrate one possible partitioning of subsystems and to particularly point out that an organized view 320 can be presented in or by any operational component. Moreover, FIG. 4 is being presented to particularly point out that computer functions that populate and display organized view 320 can avail of linkage 402 that links (e.g., directly or indirectly) to a content object repository 201$_3$. Such a linkage can be implemented using any known technique; in particular, such a linkage can be implemented via APIs and/or via one or more web services, and/or via direct access to the storage devices of the content object repository. Further, operation of, and/or functions provided in conjunction with such a linkage, can be specific to particular embodiments of the specialized viewers. (e.g., the shown specialized viewer viewer$_{T1}$, specialized viewer viewer$_{T2}$, ..., specialized viewer viewer$_{TN}$).

Moreover, FIG. 4 illustrates how an e-signature system 202$_3$ and a corresponding graphical user interface might be configured to interoperate with a content management system. In this embodiment, in addition to local document storage 412, content management system 224 includes a document event processing module 410, which document event processing module is configured to control processing within the CMS. For example, the document event processing module might trigger one or more workflows, which in turn might trigger generation of renditions, and/or which in turn might trigger generation of an entry into an audit trail, etc. Any of the foregoing triggers and/or invocation of the document event processing module might in turn cause changes to the single unified instance of e-sign object 234$_2$.

Similarly, event capture module 408 might be interfaced with an e-signature event processing module 422, which e-signature event processing module is configured to influence processing within the CMS.

The foregoing written description pertains to merely one possible embodiment and/or way to integrate an e-signature system and a graphical user interface with a CMS. Many variations are possible. For example, using some or all of the foregoing techniques, the e-signature system and a graphical user interfaces comprehended in the foregoing can be integrated through a specially defined series of setup operations and a specially defined series of content object storage operations. A GUI interface can also be integrated so as to handle any sort of events and/or GUI interactions, which handling in turn may cause corresponding actions to be taken. One example of such an integration is shown and described as pertains to the data processing system given in the following figure.

Figure 5:
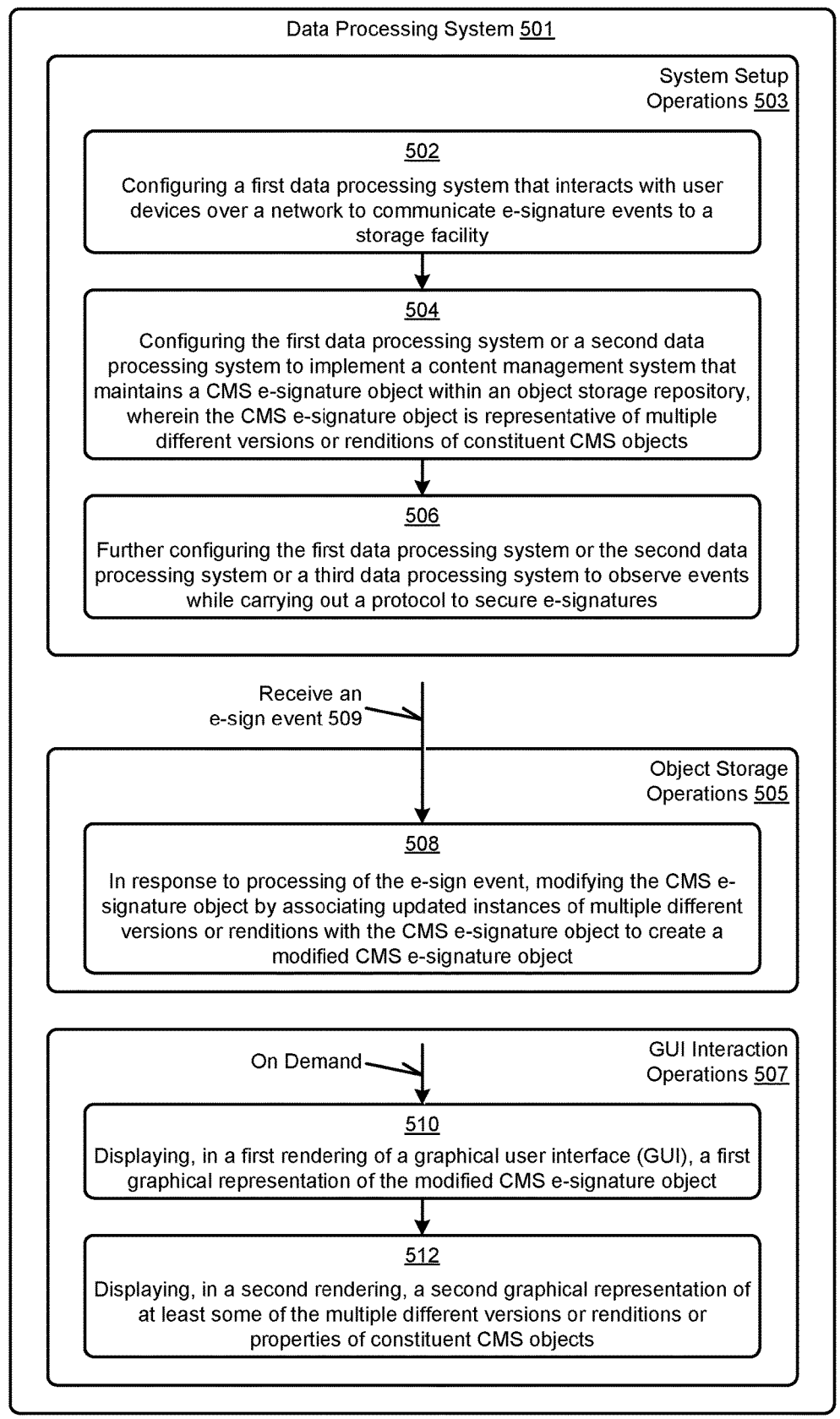
FIG. 5 illustrates a data processing system that implements example setup and ongoing operations to implement a single unified CMS object approach to e-signature event processing, according to an embodiment.

FIG. 5 illustrates a data processing system 501 that implements (1) system setup operations 503 and (2) object storage operations 505 so as to implement a single unified CMS object approach to e-signature event processing.

The shown data processing system is configured to integrate a content management system, one or more event processors, and one or more graphical user interfaces. In this configuration, the data processing system supports a unified content object approach to storing and displaying events that are raised during e-signature processing. As an option, one or more variations of any or all of (1) the e-signature event processing system, (2) the content management system, and (3) the graphical user interface or any aspect thereof may be implemented in the context of the architecture and functionality of the embodiments described herein and/or in any environment.

Strictly to illustrate system setup operations by example, the system setup operations 503 may include (1) configuring a first data processing system that interacts with user devices over a network to communicate e-signature events to a storage facility (step 502); (2) configuring the first data processing system or a second data processing system to implement a content management system that maintains a CMS e-signature content object within a content object storage repository, wherein the single CMS e-signature object is representative of multiple different versions or renditions of constituent CMS objects (step 504); and (3) still further configuring the first data processing system or the second data processing system or a third data processing system to observe events while carrying out a protocol to secure e-signatures (step 506).

There may be more or fewer or different system setup steps. In this embodiment, however, the system setup steps serve to configure the overall system to be able to process e-sign events in an asynchronous manner (e.g., as they occur, irrespective of in-progress processing of events) pertaining to object storage operations 505. Specifically, in response to processing (e.g., in step 508) of the e-sign event (e.g., event 509), the content object storage system modifies the foregoing single CMS e-signature object by associating updated instances of multiple different versions or renditions with the single CMS e-signature object, thereby creating a single modified CMS e-signature object. Various functions that are a result of, or subordinate to, GUI interaction operations 507 can be configured to start and/or to carry out, and/or to complete in a manner that is asynchronous to operation of other components of the overall system.

Specifically, the graphical user interface (GUI) system might be configured to respond on demand (e.g., on demand by a user). As such, step 510 and step 512 serve, individually or in combination to (1) display, in a first rendering of the graphical user interface, a first graphical representation of the modified single CMS e-signature object, and to (2) display, in a second rendering, a second graphical representation of at least some of the multiple different versions or renditions or properties of constituent CMS content objects.

The foregoing written description pertains to merely one possible embodiment and/or way to configure (1) an e-signature event processing system, (2) a content management system, and (3) a graphical user interface. Many alternatives or variations are possible. For example, the juxtaposition between an e-signature event processing system, a content management system, and a graphical user interface as comprehended in the foregoing can be implemented in any partitioning of functions, examples of which partitioning are shown and described as pertains to the following block diagrams.

Figure 6A:
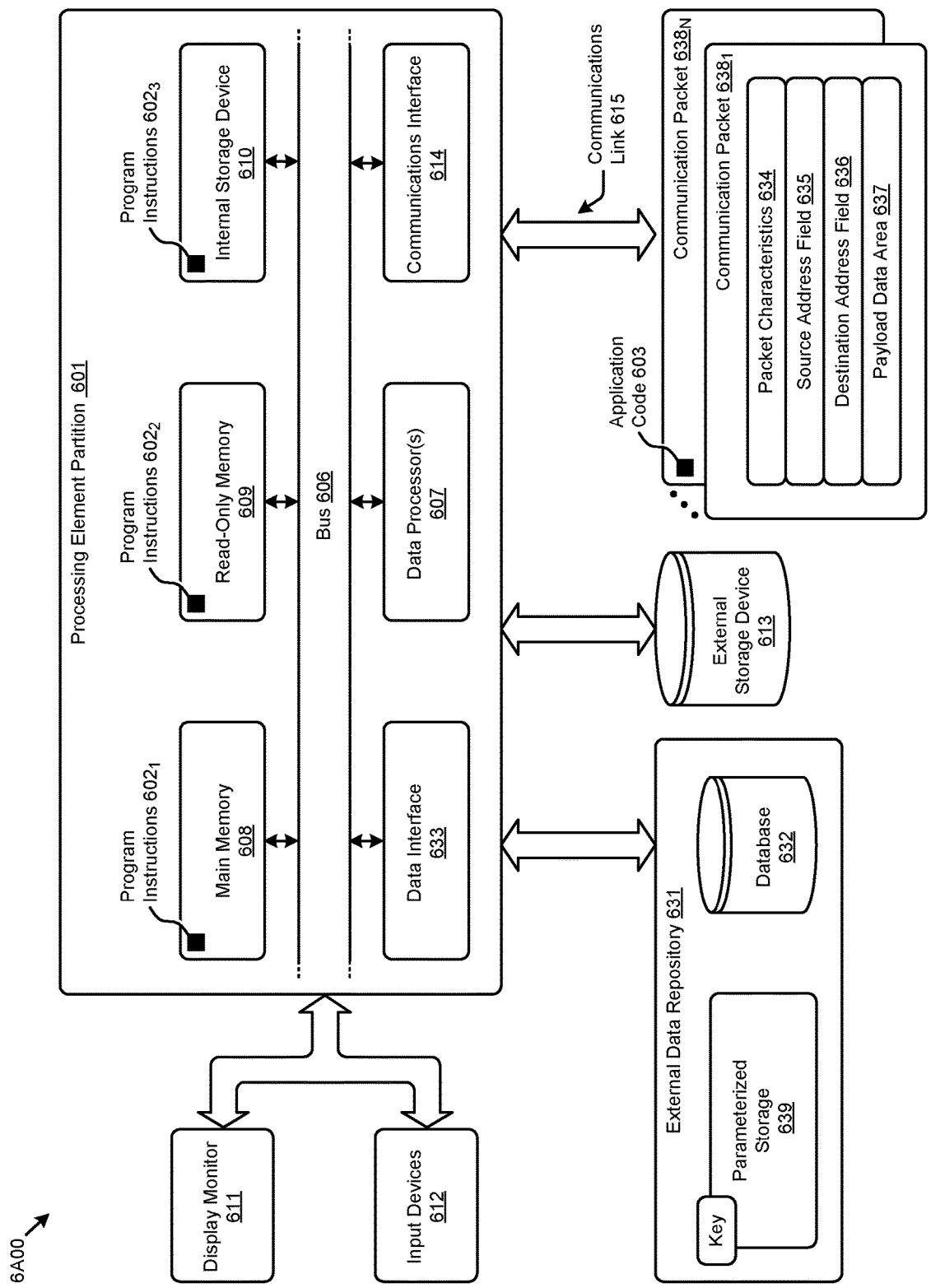
FIG. 6A, FIG. 6B and FIG. 6C present block diagrams of computing architectures having components suitable for implementing embodiments of the present disclosure and/or for use in the herein-described environments.

FIG. 6A depicts a block diagram of an instance of computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program instructions contained in a memory. Such instructions (e.g., program instructions $602_1$, program instructions $602_2$, program instructions $602_3$, etc.) can be contained in or can be read into a storage location or memory from any computer readable/usable storage medium such as a static storage device or a disk drive. The sequences can be organized so as to be accessed by one or more processing entities that are configured to execute as a single process or configured to execute as multiple concurrent processes to perform some unit of work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet $638_1$, communication packet $638_N$) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program instructions may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to defining a security perimeter based on content management system observations of user behavior. A module may include one or more state machines and/or combinational logic used to implement or facilitate the operational and/or performance characteristics pertaining to defining and/or sharing a security perimeter based on content management system observations of user behavior.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of defining and sharing a security perimeter based on content management system observations of user behavior). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to defining and sharing a security perimeter based on content management system observations of user behavior, and/or for improving the way data is manipulated when performing computerized operations pertaining to continuously updating content object-specific risk assessments.

Figure 6B:
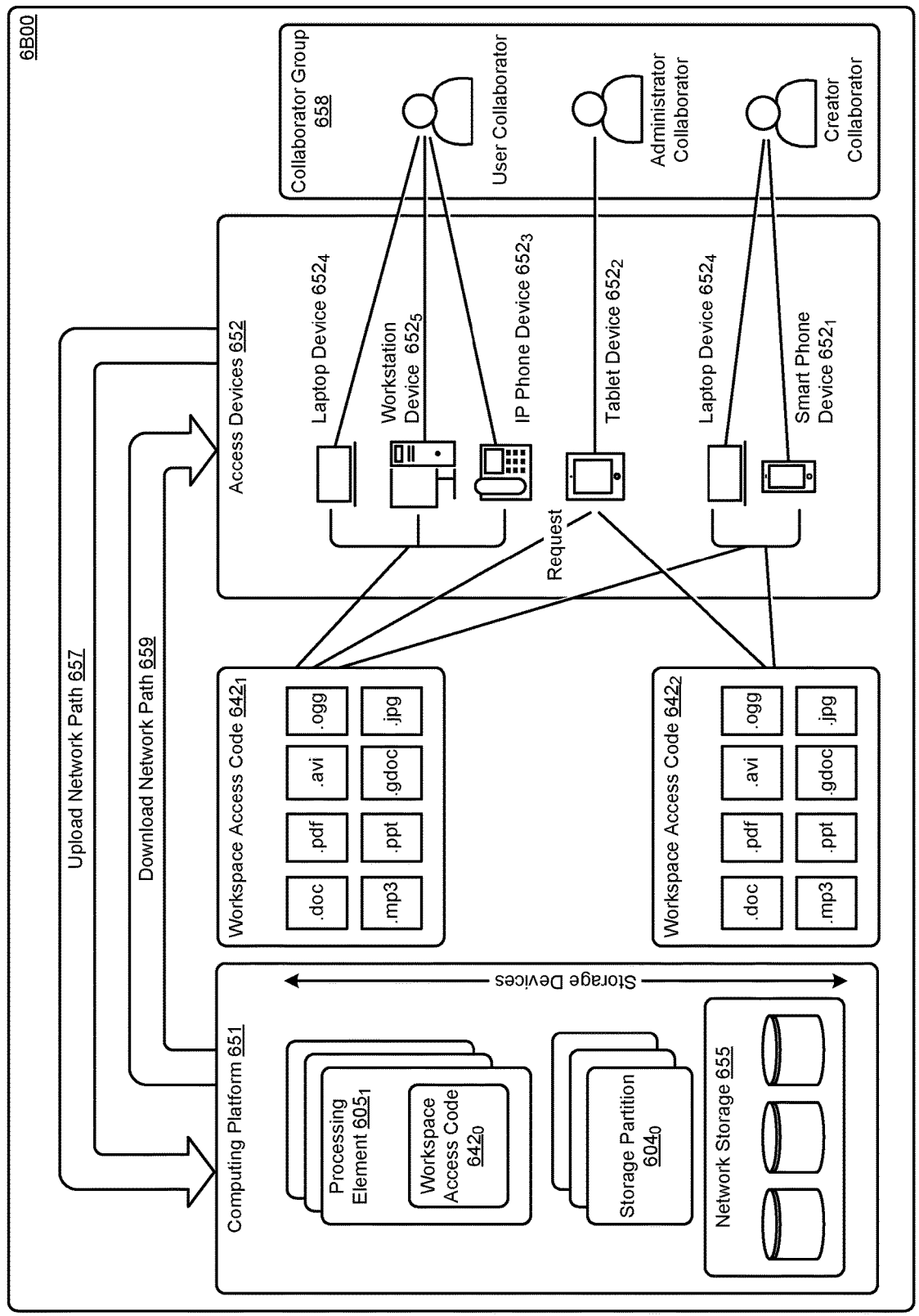

FIG. 6B depicts a block diagram of an instance of cloud-based environment 6B00. Such a cloud-based environment supports access to workspaces through the execution of workspace access code (e.g., workspace access code $642_0$, workspace access code $642_1$, and workspace access code $642_2$). Workspace access code can be executed on any of access devices 652 (e.g., laptop device $652_4$, workstation device $652_5$, IP phone device $652_3$, tablet device $652_2$, smart phone device $652_1$, etc.), and can be configured to access any type of content object. Strictly as examples, such content objects can be folders or directories or can be files of any filetype. The files or folders or directories can be organized into any hierarchy. Any type of content object can comprise or be associated with access permissions. The access permissions in turn may correspond to different actions to be taken over the content object. Strictly as one example, a first permission (e.g., PREVIEW_ONLY) may be associated with a first action (e.g., preview), while a second permission (e.g., READ) may be associated with a second action (e.g., download), etc. Furthermore, permissions may be associated to or with any particular user or any particular group of users.

A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element $605_1$). The workspace access code can interface with storage devices such as networked storage 655. Storage of workspaces and/or any constituent files or content objects, and/or any other code or scripts or data can be stored in any one or more storage partitions (e.g., storage partition $604_0$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

Figure 6C:
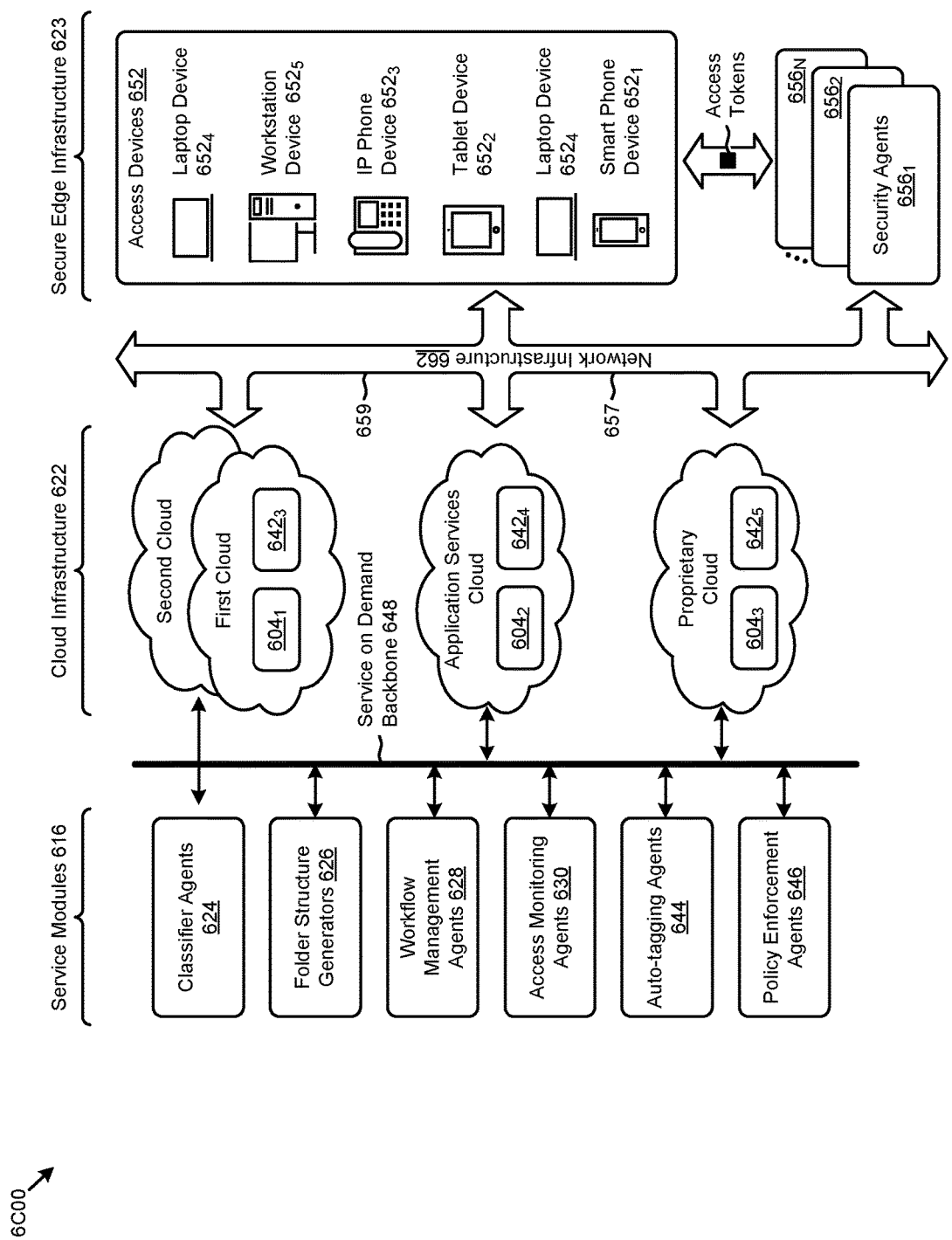

FIG. 6C depicts a block diagram of an instance of cloud-based computing system 6C00 suitable for implementing embodiments of the present disclosure. More particularly, the cloud-based computing system is suitable for implementing a cloud content management system, which cloud-based computing system is sometimes known as a cloud content manager (CCM).

The figure shows multiple variations of cloud implementations that embody or support a CCM. Specifically, public clouds (e.g., a first cloud and a second cloud) are intermixed with non-public clouds (e.g., the shown application services cloud and a proprietary cloud). Any and/or all of the clouds can support cloud-based storage (e.g., storage partition $604_1$, storage partition $604_2$, storage partition $604_3$) as well as access device interface code (workspace code $642_3$, workspace code $642_4$, workspace code $642_5$).

The clouds are interfaced to network infrastructure 662, which provides connectivity between any of the clouds and any of the access devices 652. More particularly, any constituents of the cloud infrastructure 622 can interface with any constituents of the secure edge infrastructure 623 (e.g., by communicating over the network infrastructure). The aforementioned access devices can communicate over the network infrastructure to access any forms of identity and access management tools (IAMs) which in turn can implement or interface to one or more security agents (e.g., security agents $656_1$, security agents $656_2$, . . . , security agents $656_N$). Such security agents are configured to produce access tokens, which in turn provide authentication of users and/or authentication of corresponding user devices, as well as to provide access controls (e.g., allow or deny) corresponding to various types of requests by devices of the secure edge infrastructure.

As shown, the cloud infrastructure is also interfaced for access to service modules 616. The various service modules can be accessed over the shown service on demand backbone 648 using any known technique and for any purpose (e.g., for downloading and/or for application programming interfacing and/or for local or remote execution). The service modules can be partitioned in any manner. The partitioning shown (e.g., into modules labeled as classifier agents 624, folder structure generators 626, workflow management agents 628, access monitoring agents 630, auto-tagging agents 644, and policy enforcement agents 646) is presented merely for illustrative purposes and many other service modules can be made accessible to the cloud infrastructure. Some of the possible service modules are discussed hereunder.

Classifier agents serve to automatically classify (and find) files by defining and associating metadata fields with content objects, and then indexing the results of that classification. In some cases a classifier agent processes one or more content objects for easy retrieval (e.g., via bookmarking).

Folder structure generators relieve users from having to concoct names and hierarchies for folder structures. Rather, names and hierarchies of folder structures are automatically generated based on the actual information in the content objects and/or based on sharing parameters and/or based on events.

Workflow management agents provide automation to deal with repeatable tasks and are configured to create workflow triggers that in turn invoke workflows at particularly-configured entry points. Triggers can be based on any content and/or based on any observable events. Strictly as examples, triggers can be based on events such as, content reviews, employee onboarding, contract approvals, and so on.

Access monitoring agents observe and keep track of use events such as file previews, user uploads and downloads, etc. In some embodiments, access monitoring agents are interfaced with presentation tools so as to present easy-to-understand visuals (e.g., computer-generated graphical depictions of observed user events).

Auto-tagging agents analyze combinations of content objects and events pertaining to those content objects such that the analyzed content objects can be automatically tagged with highly informative metadata and/or automatically stored in appropriate locations. In some embodiments, one or more auto-tagging agents operate in conjunction with folder structure generators so as to automatically analyze, tag and organize content (e.g., unstructured content). Generated metadata is loaded into a content object index to facilitate near instant retrieval of sought after content objects and/or their containing folders.

Policy enforcement agents run continuously (e.g., in the background) so as to aid in enforcing security and compliance policies. Certain policy enforcement agents are configured to deal with items such as content object retention schedules, achievement of time-oriented governance requirements, and establishment and maintenance of trust controls (e.g., smart access control exceptions). Further, certain policy enforcement agents apply machine learning techniques to deal with dynamic threat detection.

The CCM, either by operation of individual constituents and/or as a whole, facilitates collaboration with third parties (e.g., agencies, vendors, external collaborators, etc.) while maintaining sensitive materials in one secure place. The CCM implements cradle-to-grave controls that result in automatic generation and high availability of high-quality content through any number of collaboration cycles (e.g., from draft to final to disposal, etc.) while constantly enforcing access and governance controls.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
configuring a first data processing system that interacts with a plurality of user devices over a network that carries e-signature events raised by the plurality of user devices;
further configuring the first data processing system or a second data processing system to implement a content management system (CMS) that maintains a single CMS e-signature object within an object storage repository, wherein the single CMS e-signature object is representative of multiple different versions or renditions of constituent CMS objects;
further configuring the first data processing system or the second data processing system or a third data processing system to observe events during carrying out of a protocol to secure e-signatures,
receiving, from one of the user devices of the plurality of user devices, an e-signature event, then:
in response to processing of the e-signature event, modifying the single CMS e-signature object by associating updated instances of the multiple different versions or renditions of the constituent CMS objects with the single CMS e-signature object to create a modified single CMS e-signature object,
displaying, in a first rendering of a graphical user interface (GUI) presented on at least one user device, a first graphical representation of the modified single CMS e-signature object, and
displaying, in a second rendering of the GUI, a second graphical representation of at least some of the multiple different versions or renditions or properties of the constituent CMS objects.

2. The method of claim 1, wherein associating the updated instances of the multiple different versions or renditions with the single CMS e-signature object comprises associating metadata or properties of the multiple different versions or renditions with the single CMS e-signature object, and wherein associating the updated instances of the multiple different versions or renditions with the single CMS e-signature object does not alter the first rendering of the GUI.

3. The method of claim 2, wherein the metadata comprises at least one of a CMS workflow status and a security flag.

4. The method of claim 1, further comprising updating the first rendering to comprise a version indicator or one or more rendition indications.

5. The method of claim 4, wherein the version indicator or the one or more rendition indications corresponds to an update to the single CMS e-signature object.

6. The method of claim 1, wherein the single CMS e-signature object is representative of an envelope.

7. The method of claim 1, wherein the single CMS e-signature object is representative of a version of an envelope.

8. The method of claim 1, further comprising initiating an analysis of the protocol to secure e-signatures and generating a fraud alert based on the analysis.

9. The method of claim 1, wherein the properties of the constituent CMS objects displayed in the second rendering are derived from one or more received e-signature events.

10. A non-transitory computer readable medium having stored thereon a sequence of instructions which, when stored in memory and executed by one or more processors causes the one or more processors to perform a set of acts, the set of acts comprising:
configuring a first data processing system that interacts with a plurality of user devices over a network that carries e-signature events raised by the user devices;
further configuring the first data processing system or a second data processing system to implement a content management system (CMS) that maintains a single CMS e-signature object within an object storage repository, wherein the single CMS e-signature object is representative of multiple different versions or renditions of constituent CMS objects;
further configuring the first data processing system or the second data processing system or a third data processing system to observe events during carrying out of a protocol to secure e-signatures,
receiving, from one of the user devices of the plurality of user devices, an e-signature event, then:
in response to processing of the e-signature event, modifying the single CMS e-signature object by associating updated instances of the multiple different versions or renditions of the constituent CMS objects with the single CMS e-signature object to create a modified single CMS e-signature object,
displaying, in a first rendering of a graphical user interface (GUI) presented on at least one user device, a first graphical representation of the modified single CMS e-signature object, and
displaying, in a second rendering of the GUI, a second graphical representation of at least some of the multiple different versions or renditions or properties of the constituent CMS objects.

11. The non-transitory computer readable medium of claim 10, wherein associating the updated instances of the multiple different versions or renditions with the single CMS e-signature object comprises associating metadata or properties of the multiple different versions or renditions with the single CMS e-signature object and wherein acts of associating the updated instances of the multiple different versions or renditions with the single CMS e-signature object does not alter the first rendering of the GUI.

12. The non-transitory computer readable medium of claim 11, wherein the metadata comprises at least one of a CMS workflow status and a security flag.

13. The non-transitory computer readable medium of claim 10, further comprising instructions which, when stored in memory and executed by the one or more processors causes the one or more processors to perform acts of updating the first rendering to comprise a version indicator or one or more rendition indications.

14. The non-transitory computer readable medium of claim 13, wherein the version indicator or the one or more rendition indications corresponds to an update to the single CMS e-signature object.

15. The non-transitory computer readable medium of claim 10, wherein the single CMS e-signature object is representative of an envelope.

16. The non-transitory computer readable medium of claim 10, wherein the single CMS e-signature object is representative of a version of an envelope.

17. The non-transitory computer readable medium of claim 10, further comprising instructions which, when stored in memory and executed by the one or more processors causes the one or more processors to perform acts of initiating an analysis of the protocol to secure e-signatures and generating a fraud alert based on the analysis.

18. The non-transitory computer readable medium of claim 10, wherein the properties of the constituent CMS objects displayed in the second rendering are derived from one or more received e-signature events.

19. A system comprising:
a storage medium having stored thereon a sequence of instructions; and
one or more processors that execute the sequence of instructions to cause the one or more processors to perform a set of acts, the set of acts comprising,
configuring a first data processing system that interacts with a plurality of user devices over a network that carries e-signature events raised by the plurality of user devices;
further configuring the first data processing system or a second data processing system to implement a content management system (CMS) that maintains a single CMS e-signature object within an object storage repository, wherein the single CMS e-signature object is representative of multiple different versions or renditions of constituent CMS objects;
further configuring the first data processing system or the second data processing system or a third data processing system to observe events during carrying out of a protocol to secure e-signatures,
receiving, from one of the user devices of the plurality of user devices, an e-signature event, then:
in response to processing of the e-signature event, modifying the single CMS e-signature object by associating updated instances of the multiple different versions or renditions of the constituent CMS objects with the single CMS e-signature object to create a modified single CMS e-signature object,
displaying, in a first rendering of a graphical user interface (GUI) presented on at least one user device, a first graphical representation of the modified single CMS e-signature object, and
displaying, in a second rendering of the GUI, a second graphical representation of at least some of the multiple different versions or renditions or properties of the constituent CMS objects.

20. The system of claim 19, wherein associating the updated instances of the multiple different versions or renditions with the single CMS e-signature object comprises associating metadata or properties of the multiple different versions or renditions with the single CMS e-signature object and wherein associating the updated instances of the multiple different versions or renditions with the single CMS e-signature object does not alter the first rendering of the GUI.

21. The method of claim 1, wherein the second graphical representation of at least some of the multiple different versions or renditions or properties of the constituent CMS objects is displayed separately of the first graphical representation of the modified single CMS e-signature object, and the second graphical representation is displayable in response to user selection of a screen device of the first graphical representation.

22. The method of claim 1, wherein the single CMS e-signature object is persistently maintained in an original or modified state throughout an e-signature process comprising a plurality of e-signature events that occur to e-sign a particular document.

23. The method of claim 22, wherein the single CMS e-signature object is persistently maintained regardless of a number of e-signature events.

24. The method of claim 22, wherein the single CMS e-signature object is persistently maintained regardless of a number of variations of the particular document to be e-signed.

25. The method of claim 1, wherein the single CMS e-signature object is persistently maintained in the object storage repository and regularly modified to reflect updates to instances of the multiple different versions or renditions of the constituent CMS objects.

26. The method of claim 1, wherein the second graphical representation comprises a graphical representation of a rendition of a constituent CMS object, and wherein the rendition is an alternative representation or format of the constituent CMS object.

27. The method of claim 1, wherein the single CMS e-signature object is maintained in the object storage repository at a higher hierarchical level than the constituent CMS objects, and wherein the constituent CMS objects are separate and distinct from the single CMS e-signature object.

* * * * *